US008278250B2

(12) United States Patent
Dalrymple et al.

(10) Patent No.: US 8,278,250 B2
(45) Date of Patent: *Oct. 2, 2012

(54) METHODS USEFUL FOR DIVERTING AQUEOUS FLUIDS IN SUBTERRANEAN OPERATIONS

(75) Inventors: Eldon D. Dalrymple, Duncan, OK (US); Larry S. Eoff, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/122,836

(22) Filed: May 5, 2005

(65) Prior Publication Data

US 2005/0194140 A1 Sep. 8, 2005

Related U.S. Application Data

(63) Continuation-in-part of application No. 10/760,443, filed on Jan. 20, 2004, now Pat. No. 7,759,292, which is a continuation-in-part of application No. 10/440,337, filed on May 16, 2003, now abandoned, and a continuation-in-part of application No. 10/612,271, filed on Jul. 2, 2003, now Pat. No. 7,182,136.

(51) Int. Cl.
*E21B 33/13* (2006.01)

(52) U.S. Cl. ........ 507/219; 507/201; 507/211; 507/212; 507/214; 507/221; 507/222; 507/224; 507/225; 507/227; 507/228; 507/230; 507/252; 507/259; 507/263; 507/267; 166/279; 166/295

(58) Field of Classification Search ........................ None
See application file for complete search history.

(56) References Cited

U.S. PATENT DOCUMENTS

| | | | |
|---|---|---|---|
| 2,278,838 A | 4/1942 | Groote et al. | |
| 2,670,329 A | 2/1954 | Jones | |
| 2,687,375 A | 8/1954 | Fischer et al. | |
| 2,689,244 A | 9/1954 | Jones | |
| 2,819,278 A | 1/1958 | De Groots et al. | |
| 2,843,573 A | 7/1958 | Melamed | 526/260 |
| 2,863,832 A | 12/1958 | Perrine | 252/8.55 |
| 2,877,179 A | 3/1959 | Hughes et al. | |
| 2,910,436 A | 10/1959 | Fatt et al. | 252/8.55 |
| 3,008,898 A | 11/1961 | Hughes et al. | |
| 3,052,298 A | 9/1962 | Mallot | |
| 3,065,247 A | 11/1962 | De Groots et al. | |
| 3,138,205 A | 6/1964 | Kerver et al. | |
| 3,215,199 A | 11/1965 | Dilgren | 166/38 |
| 3,251,415 A | 5/1966 | Bombardieri et al. | 166/42 |
| 3,251,778 A | 5/1966 | Dickson | 252/82 |
| 3,258,428 A | 6/1966 | Dickson | 252/180 |
| 3,265,512 A | 8/1966 | Dickson | 106/14 |
| 3,271,307 A | 9/1966 | Woodrow et al. | |
| 3,297,090 A | 1/1967 | Dilgren | 166/38 |
| 3,307,630 A | 3/1967 | Dilgren et al. | 166/38 |
| 3,326,890 A | 6/1967 | Engelskirchen et al. | |
| 3,336,980 A | 8/1967 | Rike | |
| 3,347,789 A | 10/1967 | Dickson | 252/9.55 |
| 3,382,924 A | 5/1968 | Veley et al. | 166/42 |
| 3,404,114 A | 10/1968 | Snyder et al. | 524/812 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,489,222 A | 1/1970 | Millhone et al. | |
| 3,601,194 A | 8/1971 | Gallus | 166/283 |
| 3,615,794 A | 10/1971 | Nimerick | |
| 3,637,656 A | 1/1972 | Germino et al. | |
| 3,647,507 A | 3/1972 | Ashcraft | 427/288 |
| 3,647,567 A | 3/1972 | Schweri et al. | 428/463 |
| 3,689,418 A | 9/1972 | Cenci et al. | |
| 3,689,468 A | 9/1972 | Cenci et al. | 526/312 |
| 3,708,013 A | 1/1973 | Dismukes | |
| 3,709,298 A | 1/1973 | Pramann | |
| 3,744,566 A | 7/1973 | Szabo et al. | 166/275 |
| 3,818,991 A | 6/1974 | Nimerick | |
| 3,902,557 A | 9/1975 | Shaughnessy et al. | |
| 3,910,862 A | 10/1975 | Barabas et al. | 260/79.3 MU |
| 3,943,060 A * | 3/1976 | Martin et al. | 507/225 |
| 3,983,941 A | 10/1976 | Fitch | |
| 4,029,544 A | 6/1977 | Jarowenko et al. | |
| 4,052,343 A | 10/1977 | Cunningham | 521/32 |
| 4,052,345 A | 10/1977 | Austin et al. | 521/129 |
| 4,129,183 A | 12/1978 | Kalfoglou | 166/300 |
| 4,129,534 A | 12/1978 | Cunningham | 521/38 |
| 4,142,595 A | 3/1979 | Anderson et al. | |
| 4,152,274 A * | 5/1979 | Phillips et al. | 507/222 |
| 4,158,521 A | 6/1979 | Anderson et al. | 405/264 |
| 4,158,726 A | 6/1979 | Kamada et al. | 526/200 |
| 4,228,277 A | 10/1980 | Landoll | |

(Continued)

FOREIGN PATENT DOCUMENTS

DE   2 250 552   4/1974

(Continued)

OTHER PUBLICATIONS

Xu, et al.., Modeling of Laser Spallation Drilling of Rocks for Gas- and Oilwell Drilling, SPE 95746, 2005.

(Continued)

*Primary Examiner* — John J Figueroa
(74) *Attorney, Agent, or Firm* — Robert A. Kent; McDermott Will & Emery LLP

(57) ABSTRACT

Methods of using relative permeability modifiers for the diversion of aqueous fluids during subterranean operations are provided. An embodiment of the present invention provides a method of diverting fluids in a subterranean formation that may comprise providing a treatment fluid comprising an aqueous fluid and a relative permeability modifier that comprises water-soluble polymer with hydrophobic or hydrophilic modification; introducing the treatment fluid into a well bore that penetrates the subterranean formation; and at least a first portion of the treatment fluid to penetrate into a portion of the subterranean formation so as to substantially divert a second portion of the treatment fluid or another aqueous treatment fluid to another portion of the subterranean.

15 Claims, No Drawings

U.S. PATENT DOCUMENTS

| | | | |
|---|---|---|---|
| 4,299,710 A | 11/1981 | Dupre et al. ............... 252/8.5 A |
| 4,306,981 A | 12/1981 | Blair, Jr. |
| 4,337,828 A | 7/1982 | Blair, Jr. |
| 4,366,071 A | 12/1982 | McLaughlin et al. ... 252/8.55 R |
| 4,366,072 A | 12/1982 | McLaughlin et al. ... 252/8.55 R |
| 4,366,073 A | 12/1982 | McLaughlin et al. ... 252/8.55 R |
| 4,366,074 A | 12/1982 | McLaughlin et al. ... 252/8.55 R |
| 4,374,739 A | 2/1983 | McLaughlin et al. ... 252/8.55 R |
| 4,393,939 A | 7/1983 | Smith et al. .................. 166/293 |
| 4,395,340 A | 7/1983 | McLaughlin ............. 252/8.55 D |
| 4,401,789 A | 8/1983 | Gideon ........................ 524/827 |
| 4,409,110 A * | 10/1983 | Borchardt et al. ............ 507/227 |
| 4,439,334 A | 3/1984 | Borchardt .................. 252/8.55 D |
| 4,440,649 A | 4/1984 | Loftin et al. ................ 252/8.5 C |
| 4,441,556 A | 4/1984 | Powers et al. |
| 4,447,342 A | 5/1984 | Borchardt et al. ....... 252/8.55 D |
| 4,460,627 A | 7/1984 | Weaver et al. ................. 427/212 |
| 4,462,718 A | 7/1984 | McLaughlin et al. ........ 405/264 |
| 4,499,214 A | 2/1985 | Sortwell |
| 4,532,052 A * | 7/1985 | Weaver et al. ................. 507/222 |
| 4,536,297 A | 8/1985 | Loftin et al. ................ 252/8.5 C |
| 4,536,303 A | 8/1985 | Borchardt .................... 252/8.55 R |
| 4,536,305 A * | 8/1985 | Borchardt et al. ............ 507/222 |
| 4,552,670 A | 11/1985 | Lipowski et al. ............. 507/120 |
| 4,554,081 A | 11/1985 | Borchardt et al. ........ 252/8.5 A |
| 4,563,292 A | 1/1986 | Borchardt ................. 252/8.55 R |
| 4,604,216 A | 8/1986 | Irvin et al. ................... 252/8.51 |
| 4,608,139 A | 8/1986 | Craun et al. .................. 428/457 |
| 4,619,776 A | 10/1986 | Mondshine |
| 4,625,802 A * | 12/1986 | Sydansk ........................ 166/292 |
| 4,627,926 A | 12/1986 | Peiffer et al. ............ 252/8.55 R |
| 4,631,138 A | 12/1986 | Johns et al. |
| 4,662,448 A | 5/1987 | Ashford et al. |
| 4,671,883 A | 6/1987 | Connell ...................... 252/8.515 |
| 4,693,639 A | 9/1987 | Hollenbeak et al. .......... 405/263 |
| 4,699,722 A | 10/1987 | Dymond et al. ............ 252/8.551 |
| 4,702,319 A | 10/1987 | Bock et al. |
| 4,730,028 A | 3/1988 | Bock et al. ................... 526/225 |
| 4,814,096 A | 3/1989 | Evani ........................... 507/224 |
| 4,828,625 A | 5/1989 | Lai et al. |
| 4,828,726 A | 5/1989 | Himes et al. ................. 252/8.553 |
| 4,856,590 A | 8/1989 | Caillier |
| 4,870,167 A | 9/1989 | Zody et al. |
| 4,941,537 A | 7/1990 | Langemeier et al. |
| 4,956,104 A | 9/1990 | Cowan et al. |
| 4,959,432 A | 9/1990 | Fan et al. ...................... 526/287 |
| 4,960,876 A | 10/1990 | Molteni et al. |
| 4,993,448 A | 2/1991 | Karydas et al. |
| 5,051,197 A | 9/1991 | Kalfayan et al. |
| 5,071,934 A | 12/1991 | Peiffer .......................... 526/307 |
| 5,097,904 A | 3/1992 | Himes ........................... 166/294 |
| 5,105,886 A | 4/1992 | Strubhar et al. |
| 5,146,986 A | 9/1992 | Dalrymple ................... 166/294 |
| 5,160,642 A | 11/1992 | Schield et al. ............... 252/8.551 |
| 5,197,544 A | 3/1993 | Himes ........................... 166/294 |
| 5,208,216 A | 5/1993 | Williamson et al. ......... 507/120 |
| 5,244,042 A | 9/1993 | Dovan et al. .................. 166/270 |
| 5,248,665 A | 9/1993 | Hale et al. |
| 5,256,651 A | 10/1993 | Phelps et al. |
| 5,271,466 A | 12/1993 | Harms ........................... 166/300 |
| 5,342,530 A | 8/1994 | Aften et al. ................. 252/8.551 |
| 5,379,841 A | 1/1995 | Pusch et al. ................... 166/295 |
| 5,382,371 A | 1/1995 | Stahl et al. ................... 507/221 |
| 5,407,909 A | 4/1995 | Goodhue, Jr. et al. |
| 5,424,284 A | 6/1995 | Patel et al. |
| 5,445,223 A | 8/1995 | Nelson et al. |
| 5,473,059 A | 12/1995 | Yeh |
| 5,482,116 A | 1/1996 | El-Rabaa et al. |
| 5,566,760 A | 10/1996 | Harris |
| 5,597,783 A | 1/1997 | Audibert et al. .............. 507/120 |
| 5,607,902 A | 3/1997 | Smith et al. .................. 507/120 |
| 5,637,556 A | 6/1997 | Argillier et al. .............. 507/120 |
| 5,643,460 A * | 7/1997 | Marble et al. ................. 210/705 |
| 5,646,093 A | 7/1997 | Dino |
| 5,663,123 A | 9/1997 | Goodhue, Jr. et al. |
| 5,669,456 A | 9/1997 | Audibert et al. ................. 175/72 |
| 5,681,796 A | 10/1997 | Nimerick |
| 5,704,426 A | 1/1998 | Rytlewski et al. |
| 5,720,347 A | 2/1998 | Audibert et al. .............. 166/294 |
| 5,728,653 A | 3/1998 | Audibert et al. .............. 507/222 |
| 5,735,349 A | 4/1998 | Dawson et al. ................ 166/295 |
| 5,755,286 A | 5/1998 | Ebinger |
| 5,887,653 A | 3/1999 | Bishop et al. ................. 166/281 |
| 5,908,814 A | 6/1999 | Patel et al. |
| 5,944,106 A | 8/1999 | Dalrymple et al. ........... 166/281 |
| 5,972,848 A | 10/1999 | Audibert et al. .............. 507/119 |
| 5,979,557 A | 11/1999 | Card et al. ..................... 166/300 |
| 5,990,052 A | 11/1999 | Harris |
| 6,020,289 A | 2/2000 | Dymond |
| 6,047,773 A | 4/2000 | Zeltmann et al. |
| 6,070,664 A | 6/2000 | Dalrymple et al. ........... 166/281 |
| 6,124,245 A | 9/2000 | Patel ............................. 507/120 |
| 6,162,766 A | 12/2000 | Muir et al. |
| 6,187,839 B1 | 2/2001 | Eoff et al. ..................... 523/130 |
| 6,194,356 B1 | 2/2001 | Jones et al. |
| 6,209,646 B1 | 4/2001 | Reddy et al. |
| 6,228,812 B1 | 5/2001 | Dawson et al. ................ 507/221 |
| 6,237,687 B1 | 5/2001 | Barbee, Jr. et al. ........... 166/278 |
| 6,242,390 B1 | 6/2001 | Mitchell et al. |
| 6,248,697 B1 | 6/2001 | Goodhue, Jr. et al. |
| 6,253,851 B1 | 7/2001 | Schroeder, Jr. et al. ....... 166/278 |
| 6,277,900 B1 | 8/2001 | Oswald et al. ................ 523/130 |
| 6,281,172 B1 | 8/2001 | Warren et al. |
| 6,283,210 B1 | 9/2001 | Soliman et al. ............... 166/270 |
| 6,291,404 B2 * | 9/2001 | House ........................... 507/110 |
| 6,358,889 B2 * | 3/2002 | Waggenspack et al. ....... 507/110 |
| 6,359,047 B1 | 3/2002 | Thieu et al. ................... 524/376 |
| 6,364,016 B1 | 4/2002 | Dalrymple et al. ........... 166/270 |
| 6,380,137 B1 | 4/2002 | Heier et al. ................... 507/121 |
| 6,454,003 B1 | 9/2002 | Chang et al. |
| 6,476,169 B1 * | 11/2002 | Eoff et al. ................... 526/307.2 |
| 6,476,283 B1 | 11/2002 | Devore et al. ................ 585/250 |
| 6,497,283 B1 | 12/2002 | Eoff et al. ..................... 166/293 |
| 6,516,885 B1 | 2/2003 | Munday ........................ 166/295 |
| 6,520,255 B2 | 2/2003 | Tolman et al. |
| 6,562,762 B2 | 5/2003 | Cowan et al. |
| 6,569,983 B1 | 5/2003 | Treybig et al. ................ 528/102 |
| 6,601,648 B2 | 8/2003 | Ebinger |
| 6,605,570 B2 | 8/2003 | Miller et al. |
| 6,607,035 B1 | 8/2003 | Reddy et al. |
| 6,609,578 B2 | 8/2003 | Patel et al. ....................... 175/64 |
| 6,626,241 B2 | 9/2003 | Nguyen |
| 6,627,719 B2 | 9/2003 | Whipple et al. ............... 774/325 |
| 6,637,517 B2 | 10/2003 | Samuel et al. |
| 6,656,885 B2 | 12/2003 | House et al. |
| 6,662,874 B2 | 12/2003 | Surjaatmadja et al. |
| 6,702,044 B2 | 3/2004 | Reddy et al. |
| 6,710,107 B2 | 3/2004 | Audibert et al. .................. 524/5 |
| 6,723,683 B2 | 4/2004 | Crossman et al. |
| 6,743,288 B2 | 6/2004 | Eoff et al. ..................... 106/724 |
| 6,756,345 B2 | 6/2004 | Pakulski et al. |
| 6,764,981 B1 | 7/2004 | Eoff et al. |
| 6,767,867 B2 | 7/2004 | Chatterji et al. .............. 507/216 |
| 6,767,869 B2 | 7/2004 | DiLullo et al. |
| 6,780,822 B2 | 8/2004 | Cowan et al. |
| 6,787,506 B2 | 9/2004 | Blair et al. .................... 507/222 |
| 6,790,812 B2 | 9/2004 | Halliday et al. |
| 6,800,593 B2 | 10/2004 | Dobson, Jr. et al. |
| 6,803,348 B2 | 10/2004 | Jones et al. .................... 507/221 |
| 6,846,420 B2 | 1/2005 | Reddy et al. |
| 6,855,672 B2 | 2/2005 | Poelker .......................... 507/225 |
| 6,872,820 B2 | 3/2005 | Weber et al. |
| 6,884,760 B1 | 4/2005 | Brand et al. |
| 6,913,081 B2 | 7/2005 | Powell et al. ................. 166/279 |
| 6,962,203 B2 | 11/2005 | Funchess |
| 6,978,836 B2 | 12/2005 | Nguyen et al. |
| 6,981,552 B2 | 1/2006 | Reddy et al. |
| 7,007,752 B2 | 3/2006 | Reddy et al. |
| 7,008,908 B2 | 3/2006 | Chan et al. |
| 7,036,587 B2 | 5/2006 | Munoz, Jr. et al. |
| 7,036,589 B2 | 5/2006 | Nguyen |
| 7,081,439 B2 | 7/2006 | Sullivan et al. |
| 7,087,554 B2 | 8/2006 | Youngson et al. |
| 7,091,159 B2 * | 8/2006 | Eoff et al. ..................... 507/120 |
| 7,114,568 B2 | 10/2006 | Eoff et al. |
| 7,117,942 B2 | 10/2006 | Dalrymple et al. |
| 7,159,656 B2 | 1/2007 | Eoff et al. |

| | | | |
|---|---|---|---|
| 7,178,610 B2 | 2/2007 | Bell | |
| 7,182,136 B2 | 2/2007 | Dalrymple et al. | |
| 7,207,387 B2 | 4/2007 | Eoff et al. | |
| 7,216,707 B2 | 5/2007 | Eoff et al. | |
| 7,220,708 B2 | 5/2007 | Zamora et al. | |
| 7,398,825 B2 | 7/2008 | Nguyen et al. | |
| 7,427,583 B2 | 9/2008 | Couillet et al. | |
| 7,632,787 B2 | 12/2009 | Mirakyan et al. | |
| 7,759,292 B2 | 7/2010 | Eoff et al. | |
| 8,008,235 B2 | 8/2011 | Eoff et al. | |
| 8,091,638 B2 | 1/2012 | Dusterhoft et al. | |
| 2002/0123433 A1 | 9/2002 | Goodhue, Jr. et al. | |
| 2003/0013871 A1 | 1/2003 | Mallon et al. | |
| 2003/0019627 A1 | 1/2003 | Qu et al. | 166/281 |
| 2003/0083204 A1 | 5/2003 | Chatterji et al. | |
| 2003/0094122 A1* | 5/2003 | Eoff et al. | 106/724 |
| 2003/0104948 A1 | 6/2003 | Poelker et al. | 507/100 |
| 2003/0114317 A1 | 6/2003 | Benton et al. | |
| 2003/0139298 A1 | 7/2003 | Fu et al. | |
| 2003/0191030 A1 | 10/2003 | Blair et al. | 507/225 |
| 2004/0045712 A1* | 3/2004 | Eoff et al. | 166/293 |
| 2004/0102331 A1 | 5/2004 | Chan et al. | 507/100 |
| 2004/0171495 A1 | 9/2004 | Zamora et al. | 507/100 |
| 2004/0209780 A1 | 10/2004 | Harris et al. | |
| 2004/0220058 A1 | 11/2004 | Eoff et al. | 507/200 |
| 2004/0229756 A1 | 11/2004 | Eoff et al. | 507/219 |
| 2004/0229757 A1 | 11/2004 | Eoff et al. | 507/219 |
| 2005/0000694 A1 | 1/2005 | Dalrymple et al. | 166/307 |
| 2005/0230114 A1 | 10/2005 | Eoff et al. | |
| 2005/0230116 A1 | 10/2005 | Eoff et al. | |
| 2005/0284632 A1 | 12/2005 | Dalrymple et al. | |
| 2006/0016596 A1 | 1/2006 | Pauls et al. | |
| 2006/0124309 A1 | 6/2006 | Nguyen et al. | |
| 2006/0137875 A1 | 6/2006 | Dusterhoft et al. | |
| 2006/0234874 A1 | 10/2006 | Eoff et al. | |
| 2006/0240994 A1 | 10/2006 | Eoff et al. | |
| 2006/0266522 A1 | 11/2006 | Eoff et al. | |
| 2006/0283592 A1 | 12/2006 | Sierra et al. | |
| 2007/0012445 A1 | 1/2007 | Nguyen et al. | |
| 2008/0070805 A1 | 3/2008 | Munoz et al. | |
| 2008/0070807 A1 | 3/2008 | Munoz et al. | |
| 2008/0070808 A1 | 3/2008 | Munoz et al. | |
| 2008/0110624 A1 | 5/2008 | Nguyen et al. | |
| 2008/0139411 A1 | 6/2008 | Harris et al. | |
| 2008/0173448 A1 | 7/2008 | Nguyen et al. | |
| 2008/0196897 A1 | 8/2008 | Nguyen | |
| 2009/0291863 A1 | 11/2009 | Welton | |
| 2010/0276612 A1 | 11/2010 | De Wolf et al. | |
| 2011/0294704 A1 | 12/2011 | Eoff et al. | |
| 2012/0048550 A1 | 3/2012 | Dusterhoft et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1 193 365 A1 | 4/2002 |
| EP | 1193365 A1 * | 4/2002 |
| EP | 1 312 753 A1 | 5/2003 |
| GB | 2 221 940 A | 2/1990 |
| GB | 2335428 A | 9/1999 |
| WO | WO 99/49183 | 9/1999 |
| WO | WO 99/50530 | 10/1999 |
| WO | WO 00/78890 | 12/2000 |
| WO | WO 02/097236 A1 | 12/2002 |
| WO | WO 03/056130 | 7/2003 |
| WO | WO 2004/022667 A1 | 7/2003 |
| WO | WO 2004/022667 A1 | 3/2004 |
| WO | WO 2004/094781 | 11/2004 |
| WO | WO 2004/101706 A1 | 11/2004 |

OTHER PUBLICATIONS

Gahan, et al., Effect of Downhole Pressure Conditions on High-Power Laser Perforation, SPE 97093, 2005.
Gahan, et al., Analysis of Efficient High-Power Fiber Lasers of Well Perforation, SPE 90661, 2004.
Parker, et al., Well Perforation Using High-Power Lasers, SPE 84418, 2003.
Parker, et al., Laser Drilling: Effects of Beam Application Methods on Improving Rock Removal, SPE 84353, 2003.
Bai, et al., Improved Determination of Stree-Dependent Permeability for Anisotropic Formations, SPE 78188, 2002.
Proett, et al., Advanced Permeability and Anisotropy Measurements While Testing and Sampling in Real-Time Using a Dual Probe Formation Tester, SPE 62919, 2000.
Proett, et al., Advanced Dual Probe Formation Tester With Transient, Harmonic, and Pulsed Time-Delay Testing Methods Determines Permeability, Skin and Anisotropy, SPE 64650, 2000.
U.S. Appl. No. 10/763,800, filed Jan. 24, 2004, Eoff, et al.
U.S. Appl. No. 10/780,995, filed Feb. 18, 2004, Eoff, et al.
U.S. Appl. No. 10/806,894, filed Mar. 23, 2004, Eoff, et al.
U.S. Appl. No. 10/825,001, filed Apr. 15, 2004, Eoff, et al.
U.S. Appl. No. 10/872,997, filed Jun. 21, 2004, Eoff, et al.
U.S. Appl. No. 10/881,198, filed Jun. 29, 2004, Dalrymple, et al.
U.S. Appl. No. 10/893,210, filed Jul. 16, 2004, Eoff, et al.
U.S. Appl. No. 11/102,062, filed Apr. 8, 2005, Sierra, et al.
Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13.
Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14.
Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.
Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.
Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101:jsp?printMe.
Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.
Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.
BJ Services Company, *Aquacon, Product Information*, Aug. 1, 2001, pp. 1-2.
BJ Services Company, *Aquatrol I, Product Information*, Dec. 14, 2000, pp. 1-2.
Office action dated Nov. 16, 2007 from U.S. Appl. No. 10/760,443.
Office action dated Aug. 8, 2007 from U.S. Appl. No. 10/760,443.
Office action dated Feb. 21, 2007 from U.S. Appl. No. 10/760,443.
Office action dated Oct. 6, 2006 from U.S. Appl. No. 10/760,443.
Office action dated Mar. 23, 2006 from U.S. Appl. No. 10/760,443.
Office action dated Dec. 28, 2007 from U.S. Appl. No. 10/806,894.
Office action dated Jul. 12, 2007 from U.S. Appl. No. 10/806,894.
Office action dated Apr. 9, 2007 from U.S. Appl. No. 10/806,894.
Office action dated Jan. 3, 2007 from U.S. Appl. No. 10/806,894.
Office action dated Jul. 3, 2006 from U.S. Appl. No. 10/806,894.
Notice of allowance dated Jan. 28, 2008 from U.S. Appl. No. 11/102,062.
Office action dated Jun. 27, 2007 from U.S. Appl. No. 11/102,062.
Office action dated Feb. 1, 2008 from U.S. Appl. No. 10/440,337.
Office action dated Nov. 15, 2006 from U.S. Appl. No. 10/440,337.
Office action dated May 3, 2006 from U.S. Appl. No. 10/440,337.
Notice of allowance dated Mar. 23, 2006 from U.S. Appl. No. 10/236,722.
Office action dated Sep. 28, 2005 from U.S. Appl. No. 10/236,722.
Office action dated Jul. 5, 2005 from U.S. Appl. No. 10/236,722.
Office action dated Apr. 19, 2005 from U.S. Appl. No. 10/236,722.
Office action dated Oct. 20, 2004 from U.S. Appl. No. 10/236,722.

Notice of allowance dated Mar. 23, 2006 from U.S. Appl. No. 10/612,271.
Notice of allowance dated Jul. 18, 2006 from U.S. Appl. No. 10/825,001.
Office action dated Jan. 6, 2006 from U.S. Appl. No. 10/825,001.
Notice of allowance dated Aug. 17, 2006 from U.S. Appl. No. 10/881,198.
Notice of allowance dated May 25, 2006 from U.S. Appl. No. 10/881,198.
Notice of allowance dated Mar. 5, 2007 from U.S. Appl. No. 10/893,210.
Notice of allowance dated Feb. 27, 2007 from U.S. Appl. No. 10/893,210.
Office action dated Sep. 12, 2006 from U.S. Appl. No. 10/893,210.
Office action dated Jan. 14, 2008 from U.S. Appl. No. 11/471,148.
Office action dated Nov. 2, 2007 from U.S. Appl. No. 11/471,148.
Office action dated Sep. 20, 2007 from U.S. Appl. No. 11/471,148.
Office action dated Apr. 5, 2007 from U.S. Appl. No. 11/471,148.
Office action dated Jan. 14, 2008 from U.S. Appl. No. 11/471,738.
Office action dated Nov. 2, 2007 from U.S. Appl. No. 11/471,738.
Office action dated Sep. 20, 2007 from U.S. Appl. No. 11/471,738.
Office action dated Apr. 6, 2007 from U.S. Appl. No. 11/471,738.
Office action dated Sep. 24, 2007 from U.S. Appl. No. 10/862,132.
Office action dated Jul. 12, 2007 from U.S. Appl. No. 10/862,132.
Office action dated Jan. 22, 2007 from U.S. Appl. No. 10/862,132.
Office action dated Jul. 28, 2006 from U.S. Appl. No. 10/862,132.
Office action dated Mar. 26, 2008 from U.S. Appl. No. 10/862,132.
Office action dated Mar. 26, 2008 from U.S. Appl. No. 11/360,215.
Office action dated Apr. 3, 2008 from U.S. Appl. No. 10/760,443.
Office Action dated May 22, 2008 from U.S. Appl. No. 11/102,062.
U.S. Appl. No. 12/080,647, filed Apr. 4, 2008.
Office Action dated Jun. 13, 2008 from U.S. Appl. No. 10/806,894.
Office Action from U.S. Appl. No. 11/485,199 mailed Sep. 24, 2008.
Office Action from U.S. Appl. No. 10/440,337 mailed Sep. 25, 2008.
Office Action from U.S. Appl. No. 11/102,062 mailed Sep. 23, 2008.
Office Action from U.S. Appl. No. 11/501,595 mailed Sep. 24, 2008.
Office Action for U.S. Appl. No. 10/862,132, dated Apr. 28, 2009.
Office Action for U.S. Appl. No. 11/360,215, dated Apr. 28, 2009.
Office Action for U.S. Appl. No. 11/485,199, dated Apr. 28, 2009.
Office Action mailed Oct. 31, 2008, for U.S. Appl. No. 10/862,132.
Office Action mailed Nov. 17, 2008, for U.S. Appl. No. 11/471,148.
Office Action mailed Nov. 18, 2008, for U.S. Appl. No. 11/471,738.
Office Action for U.S. Appl. No. 10/806,894, mailed Dec. 17, 2008.
Office Action for U.S. Appl. No. 10/760,443, mailed Dec. 23, 2008.
Office Action for U.S. Appl. No. 11/360,215 dated Sep. 17, 2008.
Office Action for U.S. Appl. No. 10/806,894 dated Jul. 10, 2009.
Office Action for U.S. Appl. No. 11/501,595 dated Aug. 17, 2009.
Office Action for U.S. Appl. No. 11/102,062, dated Nov. 12, 2009.
Office Action for U.S. Appl. No. 11/485,199, dated Nov. 18, 2009.
Office Action for U.S. Appl. No. 11/360,215, dated Dec. 7, 2009.
Office Action for U.S. Appl. No. 11/360,215 dated Jun. 9, 2010.
Office Action for U.S. Appl. No. 11/102,062 dated Jun. 29, 2010.
Office Action for U.S. Appl. No. 11/501,595 dated Jun. 29, 2010.
Office Action for U.S. Appl. No. 10/862,132 dated Dec. 30, 2009.
Office Action for U.S. Appl. No. 11/501,595 dated Feb. 5, 2010.
Notice of Allowance for U.S. Appl. No. 10/760,443 dated Feb. 8, 2010.
Office Action for U.S. Appl. No. 11/102,062 dated Feb. 24, 2010.
Notice of Allowance for U.S. Appl. No. 10/862,132 dated Apr. 1, 2010.
Office Action for U.S. Appl. No. 10/806,894 dated Apr. 1, 2010.
Office Action for U.S. Appl. No. 11/485,199 dated Sep. 8, 2010.
Office Action for U.S. Appl. No. 11/360,215 dated Sep. 8, 2010.
Office Action for U.S. Appl. No. 12/533,150 dated Jan. 7, 2011.
Office Action for U.S. Appl. No. 11/485,199 dated Feb. 8, 2011.
Office Action for U.S. Appl. No. 11/360,215 dated Feb. 8, 2011.
Office Action for U.S. Appl. No. 11/501,595 dated Feb. 8, 2011.
Office Action for U.S. Appl. No. 10/806,894 dated Mar. 17, 2011.
Office Action for U.S. Appl. No. 11/102,062 dated Mar. 23, 2011.
Office Action for U.S. Appl. No. 10/806,894 dated Oct. 5, 2010.
Office Action for U.S. Appl. No. 11/102,062 dated Nov. 18, 2010.
Office Action for U.S. Appl. No. 12/533,150 dated Jun. 10, 2011.
Office Action for U.S. Appl. No. 11/501,595 dated Jun. 27, 2011.
Office Action for U.S. Appl. No. 11/102,062 dated Jun. 29, 2011.
Office Action for U.S. Appl. No. 11/360,215 dated Jul. 5, 2011.
Notice of Allowance and Notice of Allowability for U.S. Appl. No. 11/471,148, May 20, 2009.
Notice of Allowance and Notice of Allowability for U.S. Appl. No. 11/471,738, Jun. 17, 2009.

* cited by examiner

METHODS USEFUL FOR DIVERTING AQUEOUS FLUIDS IN SUBTERRANEAN OPERATIONS

CROSS-REFERENCE TO RELATED APPLICATION

This application is a continuation-in-part of U.S. application Ser. No. 10/760,443 filed on Jan. 20, 2004 now U.S. Pat. No. 7,759,292, which is a continuation-in-part of U.S. application Ser. No. 10/440,337 filed on May 16, 2003 now abandoned and U.S. application Ser. No. 10/612,271 filed on Jul. 2, 2003 now U.S. Pat. No. 7,182,136, which are incorporated herein by reference.

BACKGROUND

The present invention relates to subterranean operations and, more particularly, to methods of using relative permeability modifiers for the diversion of aqueous fluids during subterranean operations.

The diversion of treatment fluids in subterranean operations is well known and may be desirable in a variety of subterranean operations, such as acid stimulation operations, injection operations, scale inhibition operations, and clay stabilization operations. In many instances, diversion is desirable because the treatment fluid may preferentially enter portions of a subterranean formation with high permeability at the expense of portions of the subterranean formation with lesser permeability. For example, in acid stimulation operations, it may be desired to contact less permeable portions of the subterranean formation with the treatment fluid containing an acid so as to achieve the desired stimulation. In scale inhibition operations and clay stabilization operations, it may be desirable to divert the treatment fluid so as to obtain a uniform distribution of the treatment fluid throughout the subterranean formation regardless of the permeability of the particular portion thereof. In some instances, these high-permeability portions of the subterranean formation may be watered-out zones, which predominately produce water rather than the desired hydrocarbons.

A variety of techniques have been used to divert treatment fluids to less permeable portions of a subterranean formation. Such techniques have involved, among other things, the injection of particulates, foams, or blocking polymers (e.g., crosslinked aqueous gels) into the subterranean formation so as to plug off the high-permeability portions of the subterranean formation, thereby diverting subsequently injected fluids to less permeable portions of the subterranean formation. While each of these diversion techniques has been used successfully, there may be disadvantages. In some instances, plugging off the high-permeability sections may not be suitable for a producing formation, for example, because the injected solution (or material) may reduce or stop the flow of hydrocarbons in addition to the achieving a desired diversion of the treatment fluid. Therefore, to return the formation to production, expensive and/or time-consuming remedial treatments may be required to remove the injected solution (or material). Furthermore, techniques geared toward injecting solutions (or materials) designed to plug off high-permeability portions of the subterranean formation may require expensive zonal isolation, which may be inaccurate, leading to inadvertent plugging of and/or damage to the hydrocarbon-bearing sections.

SUMMARY

The present invention relates to subterranean operations and, more particularly, to methods of using relative permeability modifiers for the diversion of aqueous fluids during subterranean operations.

An embodiment of the present invention provides a method of diverting fluids in a subterranean formation. In an example of such a method, the method may comprise providing a treatment fluid comprising an aqueous fluid and a relative permeability modifier that comprises a water-soluble polymer with hydrophobic or hydrophilic modification; introducing the treatment fluid into a well bore that penetrates the subterranean formation; and allowing at least a first portion of the treatment fluid to penetrate into a portion of the subterranean formation so as to substantially divert a second portion of the treatment fluid or another aqueous treatment fluid to another portion of the subterranean.

Another example of such a method may comprise providing a treatment fluid comprising an aqueous fluid and a relative permeability modifier that comprises a water-soluble polymer with hydrophobic or hydrophilic modification; introducing the treatment fluid into a well bore that penetrates the subterranean formation; allowing at least a portion of the treatment fluid to penetrate into a portion of the subterranean formation thereby reducing the permeability of the portion of the subterranean formation to aqueous liquids without substantially reducing the permeability to hydrocarbons; introducing a second aqueous treatment fluid into the well bore; and substantially diverting the second aqueous treatment fluid from the portion of the subterranean formation to another portion of the subterranean formation.

Other and further features and advantages of the present invention will be readily apparent to those skilled in the art upon a reading of the description of the preferred embodiments that follows.

DESCRIPTION OF PREFERRED EMBODIMENTS

The present invention relates to subterranean operations and, more particularly, to methods of using relative permeability modifiers for the diversion of aqueous fluids during subterranean operations. As used herein, "relative permeability modifier" refers to a compound that is capable of reducing the permeability of a subterranean formation to aqueous fluids without substantially changing the formation's permeability to hydrocarbons.

The methods of the present invention generally comprise providing a treatment fluid of the present invention that comprises an aqueous fluid and a relative permeability modifier; introducing the treatment fluid into a well bore that penetrates a subterranean formation; and allowing at least a first portion of the treatment fluid to penetrate into a portion of the subterranean formation. The presence of the relative permeability modifier in the portion of the subterranean formation should substantially divert a second portion of the treatment fluid or another aqueous treatment fluid to another portion of the subterranean formation. The methods of the present invention may be useful in a variety of subterranean operations, such as acid stimulation operations, injection operations, clay stabilization operations, and scale inhibition operations, where diversion may be required.

The treatment fluids of the present invention generally comprise an aqueous fluid and a relative permeability modifier. A variety of additional additives suitable for use in subterranean operations also may be included in the treatment fluids as desired. The aqueous fluid of the treatment fluids of the present invention may include freshwater, saltwater, brine (e.g., saturated saltwater), or seawater. Generally, the aqueous fluid may be from any source, provided that it does not contain components that may adversely affect other components in the treatment fluid.

The relative permeability modifiers useful in the present invention may be any suitable relative permeability modifier that is suitable for use in subterranean operations. After introduction into a portion of the subterranean formation, the relative permeability modifier should attach to surfaces within the subterranean formation, thereby reducing the permeability of the portion of the subterranean formation to aqueous fluids without substantially changing the formation's permeability to hydrocarbons. Examples of suitable relative permeability modifiers include water-soluble polymers with hydrophobic or hydrophilic modification. As used herein, "water-soluble" refers to at least 0.01 weight percent soluble in distilled water. A water-soluble polymer with hydrophobic modification is referred to herein as a "hydrophobically modified polymer." As used herein, the term "hydrophobic modification," or "hydrophobically modified," refers to the incorporation into the hydrophilic polymer structure of hydrophobic groups, wherein the alkyl chain length is from about 4 to about 22 carbons. A water-soluble polymer with hydrophilic modification is referred to herein as a "hydrophilically modified polymer." As used herein, the term "hydrophilic modification," or "hydrophilically modified," refers to the incorporation into the hydrophilic polymer structure of hydrophilic groups, such as to introduce branching or to increase the degree of branching in the hydrophilic polymer.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone, the polymer backbone comprising polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized utilizing any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the relevant disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction is an amino methacrylate/alkyl amino methacrylate copolymer. A suitable dimethlyaminoethyl methacrylate/alkyl-dimethylammoniumethyl methacrylate copolymer is a dimethylaminoethyl methacrylate/hexadecyldimethylammoniumethyl methacrylate copolymer. As previously discussed, these copolymers may be formed by reactions with a variety of alkyl halides. For example, in some embodiments, the hydrophobically modified polymer may be a dimethylaminoethyl methacrylate/hexadecyl-dimethylammoniumethyl methacrylate bromide copolymer.

In another embodiment of the present invention, the fluid loss control additives of the present invention may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized utilizing any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching, of a hydrophilic polymer. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens, sulfonates, sulfates, organic acids, and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of a suitable relative permeability modifier should be present in the treatment fluids of the present invention to provide the desired degree of diversion. The amount of the relative permeability modifier to include in the treatment fluid depends on a number of factors including, the composition of the fluid to be diverted, the porosity and/or permeability of the formation, injection pressure limitations, and the like. In some embodiments, a relative permeability modifier may be present in a treatment fluid of the present invention in an amount in the range of from about 0.02% to about 10% by weight of the fluid. In some embodiments, a relative permeability modifier may be present in an amount in the range of from about 0.05% to about 1.0% by weight of the fluid. In certain embodiments of the present invention, the relative permeability modifier may be provided in a concentrated aqueous solution prior to its combination with the other components necessary to form a treatment fluid of the present invention.

Additional additives may be included in the treatment fluids of the present invention as deemed appropriate for a particular application by one skilled in the art, with the benefit of this disclosure. Examples of such additives include, but are not limited to, acids, weighting agents, surfactants, scale inhibitors, antifoaming agents, bactericides, salts, foaming agents, fluid loss control additives, viscosifying agents, gel breakers, clay stabilizers, and combinations thereof.

The treatment fluids of the present invention may be used for the diversion of aqueous fluids in a variety of subterranean operations, such as in acid stimulation operations, injection operations, scale inhibition operations, and clay stabilization operations. In some embodiments, the methods comprise: providing a treatment fluid of the present invention that comprises an aqueous fluid and a relative permeability modifier; introducing the treatment fluid into a well bore that penetrates a subterranean formation; and allowing at least a first portion of the treatment fluid to penetrate into a portion of the subterranean formation so that the relative permeability modifier present in the portion of the subterranean formation substantially diverts a second portion of the treatment fluid or another aqueous fluid to another portion of the subterranean formation. It is believed that the relative permeability modifier attaches to surfaces within the porosity of the portion of the subterranean formation. Among other things, the presence of the relative permeability modifier in the portion of the subterranean formation should reduce the permeability thereof to aqueous fluids without substantially changing its permeability to hydrocarbons. Due to the reduction in the permeability of the portion of the subterranean formation, any aqueous fluid subsequently introduced into the well bore should be substantially diverted to another portion of the subterranean formation. Additionally, the relative permeability modifiers also may act to reduce subsequent problems associated with water flowing into the well bore from the subterranean formation. In some embodiments, the water-soluble, relative permeability modifier may be mixed with the aqueous fluid and introduced into a portion of the subterranean formation between stages of a treatment or as a pretreatment. In some embodiments, the treatment fluids of the present invention may be self-diverting. For example, in some embodiments, the relative permeability modifier may be included in the treatment fluid during the subterranean treatment. In these embodiments, the relative permeability modifier may progressively divert the treatment fluid to another portion of the subterranean formation. For instance, in some embodiments, as a first portion of the treatment fluid penetrates into a portion of the subterranean formation a second portion of the treatment fluid may be diverted to another portion of the subterranean formation.

In acid stimulation operations, in some embodiments, a treatment fluid of the present invention may be introduced into the subterranean formation between stages of the acid stimulation operation, as a pretreatment, or as a combination thereof. For example, when the acid stimulation operation is performed in stages, in the first stage an aqueous acidizing fluid may be introduced into a portion of the subterranean formation, followed by a treatment fluid of the present invention. The relative permeability modifier present in the particular treatment fluid of the present invention should reduce the permeability of the portion of the subterranean formation to aqueous fluids. The second stage of the acid stimulation formation then may be substantially diverted to another portion of the subterranean formation. Alternating stages of the aqueous acidizing fluid and the treatment fluid of the present invention may be continued as desired. In other embodiments, the treatment fluids of the present invention may be used as a pretreatment. For instance, a treatment fluid of the present invention may be introduced in a portion of the subterranean formation, wherein the relative permeability modifier present in the treatment fluid of the present invention reduces the permeability of the portion of the subterranean formation to aqueous fluids. Any aqueous fluids introduced into the well bore after the pretreatment, such as an aqueous acidizing fluid, may be substantially diverted to another portion of the subterranean formation. In other embodiments, the aqueous acidizing fluid may be self-diverting. In the self-diverting embodiments, at least a portion of the aqueous acidizing fluid may be a treatment fluid of the present invention that further comprises an acid. In these embodiments, the relative permeability modifier may progressively divert the treatment fluid to other portions of the subterranean formation. For instance, in some embodiments, as a first portion of the treatment fluid penetrates into a portion of the subterranean formation a second portion of the treatment fluid may be diverted to another portion of the subterranean formation.

The methods of the present invention may be used in scale inhibition operations to, among other things, create a more evenly treated subterranean formation. In a scale inhibition operation, an aqueous fluid that comprises a shale inhibitor may be introduced into a portion of the subterranean formation. Examples of suitable scale inhibitors include, but are not limited to, polyphosphates, phosphate esters, phosponates, polyacrylic acid and salts thereof, and other carboxylic acid containing polymers. Examples of suitable scale inhibitors commercially available from Halliburton Energy Services, Inc., Duncan, Okla., include SCALE CHECK SCP-2™ scale inhibitor, SCALE CHECK HT™ scale inhibitor, and SCALE CHECK LP-55™ scale inhibitor. An example of a suitable phosphonate ester scale inhibitor includes DEQUEST® phosphonates, available from Solutia Corp., Springfield, Mass. Generally, introducing the fluid comprising the scale inhibitor into the portion comprises squeezing the fluid into the porosity of the portion of the subterranean formation so that the scale inhibitor adsorbs onto surfaces within the porosity of the portion of the subterranean formation. After the well is put back into production, the scale inhibitor should redissovle in any fluids (such as water) produced from the formation and act to at least partially prevent the formation of scale out of the water. In some embodiments, a scale inhibition operation may be combined with an acid stimulation operation, a clay stabilization operation, or any other suitable subterranean operation.

In scale inhibition operations, in some embodiments, a treatment fluid of the present invention may be introduced into a portion of the subterranean formation between stages of the scale inhibition operation, as a pretreatment, or as a combination thereof. For example, when the scale inhibition operation is performed in stages, in the first stage an aqueous fluid containing the scale inhibitor may be introduced into a portion of the subterranean formation, followed by a treatment fluid of the present invention. The relative permeability modifier present in the treatment fluid of the present invention should reduce the permeability of the portion of the subterranean formation to aqueous fluids. The second stage of the scale inhibition operation then may be substantially diverted to other portions of the subterranean formation. Alternating stages of the aqueous fluid comprising the scale inhibitor and the treatment fluid of the present invention may be continued as desired. In other embodiments, the treatment fluids of the present invention may be used as a pretreatment. For instance, a treatment fluid of the present invention may be introduced into a portion of the subterranean formation, wherein the relative permeability modifier present in the composition useful in the present invention reduces the permeability of the portion of the subterranean formation to aqueous fluids. Any aqueous fluids introduced into the well bore after the pretreatment, e.g., as part of the scale inhibition operation, may be substantially diverted to other portions of the subterranean formation. In other embodiments, the scale inhibition operation may be self-diverting. In the self diverting embodiments, at least a portion of the aqueous fluid comprising the scale inhibitor may be a treatment fluid of the present invention that further comprises a scale inhibitor. In these embodiments, the relative permeability modifier present in the treatment fluid may progressively divert the treatment fluid to other portions of the subterranean formation. For example, in some embodiments, as a first portion of the treatment fluid penetrates into a portion of the subterranean formation a second portion of the treatment fluid may be diverted to another portion of the subterranean formation.

The methods of the present invention also may be utilized in clay stabilization operations to, among other things, create a more evenly treated subterranean formation. In a clay stabilization operation, an aqueous fluid that comprises a clay stabilizer may be introduced into a portion of the subterranean formation. Examples of suitable clay stabilizers include, but are not limited to, salt solutions containing, for example, sodium chloride, potassium chloride, or ammonium chloride; cationic polymers and oligomers, for example, poly(dimethyldiallylammonium chloride), cationic poly(acrylamide) and cationic poly(diemethylaminoethylmethacrylate). Examples of clay stabilizers commercially available from Halliburton Energy Services, Inc., Duncan, Okla., include CLAYFIX™ clay control material, CLAYFIX II™ clay control material, CLA-STA® XP clay-stabilizing agent, and CLA-STA® FS compound. Generally, introducing the fluid containing the clay stabilizer into the portion comprises squeezing the fluid into the porosity of the portion of the subterranean formation so that the clay stabilizer acts to at least partially stabilize the portion of the subterranean formation, e.g., by reducing the propensity of clays present in the portion of the subterranean formation to swell or migrate. In some embodiments, a clay stabilization operation may be combined with an acid stimulation operation, a scale inhibition operation, or any other suitable subterranean operation.

In clay stabilization operations, in some embodiments, a treatment fluid of the present invention may be introduced into a portion of the subterranean formation between stages of the clay stabilization operation, as a pretreatment, or as a combination thereof. For example, when the clay stabilization operation is performed in stages, in the first stage an aqueous fluid comprising a clay stabilizer may be introduced into a portion of the subterranean formation, followed by a treatment fluid of the present invention. The relative permeability modifier present in the treatment fluid of the present invention should reduce the permeability of the portion of the subterranean formation to aqueous fluids. The second stage of the clay stabilization operation then may be substantially diverted to other portions of the subterranean formation. Alternating stages of the aqueous fluid comprising the clay stabilizer and the treatment fluid of the present invention may be continued as desired. In other embodiments, the treatment fluids of the present invention may be used as a pretreatment. For example, a treatment fluid of the present invention may be introduced into a portion of the subterranean formation, wherein the relative permeability modifier present in the treatment fluid reduces the permeability of the portion of the subterranean formation to aqueous fluids. Any aqueous fluids introduced into the well bore after the pretreatment, e.g., as part of the clay stabilization operation, may be substantially diverted to other portions of the subterranean formation. In other embodiments, the clay stabilization operation may be self diverting. In the self-diverting embodiments, at least a portion of the aqueous fluid comprising a clay stabilizer may be a treatment fluid of the present invention that further comprises a clay stabilizer. In these embodiments, the relative permeability modifier present in the treatment fluid may progressively divert the treatment fluid to other portions of the subterranean formation. For example, in some embodiments, as a first portion of the treatment fluid penetrates into a portion of the subterranean formation a second portion of the treatment fluid may be diverted to another portion of the subterranean formation.

To facilitate a better understanding of the present invention, the following examples of specific embodiments are given. In no way should the following examples be read to limit, or to define, the scope of the invention.

EXAMPLES

Example 1

A relative permeability modifier useful in the present invention was prepared by mixing 47.7 grams ("g") of deionized water, 0.38 g of (n-hexadecyl) dimethylammonium ethyl methacrylate bromide, and 1.1 g of acrylamide, and sparging with nitrogen for approximately 30 minutes. Thereafter, a polymerization initiator, such as 0.0127 g of 2,2'-azo bis(2-amidinopropane)dihydrochloride, was added. The resulting solution was then heated, with stirring, to 110° F. and held for 18 hours to produce a highly viscous polymer solution.

Example 2

A relative permeability modifier useful in the present invention was prepared by mixing 41.2 g of deionized water, 0.06 g of octadecyl methacrylate, 0.45 g of cocoamidopropyl betaine surfactant, and 1.26 g of acrylamide. Thereafter, a polymerization initiator, such as 0.0127 g of 2,2'-azo bis(2-amidinopropane)dihydrochloride, was added. The resulting solution was then heated, with stirring, to 110° F. and held for 18 hours to produce a highly viscous polymer solution.

Example 3

A relative permeability modifier useful in the present invention was prepared as follows. First, a polymer was made by mixing 1,968 g of deionized water, 105 g of dimethylaminoethyl methacrylate and sparging with nitrogen for 30 minutes. Thereafter, the pH was adjusted to approximately 7.9 with sulfuric acid and a polymerization initiator, such as 00.46 g of 2,2'-azo bis(2-amidinopropane)dihydrochloride was added. The resulting solution was then heated, with stirring, to 110° F. and held for 18 hours to produce poly(dimethylaminoethyl methacrylate).

The poly(dimethylaminoethyl methacrylate) was then hydrophobically modified by adding 71.0 g of poly(dimethylaminoethyl methacrylate) to a 250 ml round flask, followed by 15% NaOH to achieve a pH of approximately 8.9. Next, 54.6 g of water, 0.36 g of C16 alkyl(n-hexadecyl) bromide, and 0.39 g of benzylcetyldimethylammonium bromide surfactant were added to quaternize the poly(dimethylaminoethyl methacrylate) homopolymer and form a dimethylaminoethyl methacrylate/hexadecyl-dimethylammoniumethyl methacrylate copolymer. This mixture was then heated, with stirring, to 140° F. and held for 24 hours to produce a highly viscous polymer solution.

Example 4

A relative permeability modifier useful in the present invention was prepared as follows. First, a polymer was made by mixing 45.0 g of dimethylaminoethyl methacrylate, 6.8 g acrylic acid, 372.0 g of water and sparging with nitrogen for 30 minutes. Thereafter, the pH was adjusted to approximately 5.3 with 5.7 mL of concentrated sulfuric acid, followed by the addition of 0.2 mL of 2-mercaptoethanol and 1.3 g of 2,2'-azo bis(2-amidinopropane)dihydrochloride. The resulting solution was then heated to 71° C., with stirring, and held for 18 hours to produce poly(dimethylaminoethyl methacrylate/acrylic acid).

The poly(dimethylaminoethyl methacrylate/acrylic acid) was then hydrophilically modified by adding 95.0 g of the polymer to a 250 mL roundbottom flask, followed by the addition of 5.7 g of a 65% solution of an epichlorohydrin-terminated polyethylene oxide methyl ether and 8.0 g of sodium chloride. Approximately 17 mL of 3% active sodium hydroxide solution was then added to reach a pH of approximately 8.2. The mixture was then heated, with stirring, to 71° C. The viscosity of the solution was monitored, and when the viscosity reached 2000 centipoise (as measured with a Brookfield LVT viscometer, #2 spindle at 12 rpm, 25° C.) the reaction was terminated by removing the heat source and adding mL of 17% hydrochloric acid, 2.0 g sodium chloride and 14.7 g water.

Example 5

Tests were performed to illustrate how a relative permeability modifier useful in the present invention may affect the diversion of aqueous fluids in carbonate lithology. The cores used in these tests were Bedford limestone cores having dimensions of 6 inches in length by a 1-inch diameter. The water core was a Bedford limestone core at residual water saturation. The oil core was a Bedford limestone core at residual oil saturation. The tests were performed at 175° F. and a differential pressure of 22 atmospheres across the core.

The sample treatment fluid used in this example contained 2,000 ppm of a relative permeability modifier in a 2% by weight potassium chloride brine. Thus, the sample treatment fluid used comprised 2% of KCl by weight and 0.2% of a relative permeability modifier by weight. The relative permeability modifier was a dimethylaminoethyl methacrylate/hexadecyl-dimethylammoniumethyl methacrylate copolymer prepared as described in Example 3.

For the flow sequences listed in this example, the water was an API brine of 9% NaCl by weight and 1% $CaCl_2$ by weight, the acid was aqueous solution containing 0.5% HCl by weight, the oil was kerosene, and the spacer fluid was an aqueous solution containing 5% $NH_4Cl$ by weight.

The following procedure was used for this series of tests. The cores were connected such that a sample treatment fluid could enter either core using a parallel flow system. The parallel flow system may represent, for example, bullheading a treatment fluid into a well with layered water-producing and oil-producing zones. Parallel flow tests are described in "Structure and Process Optimization for Use of a Polymeric Relative-Permeability Modifier in Conformance Control," SPE 64985 presented at the 2001 SPE International Symposium on Oilfield Chemistry held in Houston, Tex., February 13-16, the relevant disclosure of which is incorporate herein by reference.

Once the cores were placed in parallel, a control test was first performed by flowing 200 ml of the acid into the parallel flow system. The acid preferentially entered the water core with 142 ml of the acid entering the water core and 58 ml of the acid entering the oil core. The results of the control test are shown in Table 1.

After the control test, the cores were placed in parallel so that the sample treatment fluid could enter either core. Subsequent to the core's placement in parallel, the parallel flow system experienced a treatment flow sequence of sample treatment fluid-spacer fluid-acid. After treatment with the sample treatment fluid, the majority of the acid was diverted from the water core to the oil core. 175 ml of the acid entered the oil core and 25 ml of the acid entered the water core. The results of the treatment are shown in Table 1.

TABLE 1

| | Volume of Acid Entering Core (ml) |
|---|---|
| Control | |
| Water Core | 142 |
| Oil Core | 58 |
| Treatment | |
| Water Core | 25 |
| Oil Core | 175 |

Therefore, Example 5 indicates that a relative permeability modifier useful in the present invention may be suitable for the diversion of aqueous fluids.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of diverting fluids in a subterranean formation, the method comprising:
   providing a treatment fluid comprising: an aqueous fluid, a scale inhibitor, and a relative permeability modifier comprising a hydrophobically modified water-soluble polymer that is:
   synthesized from a reaction between a hydrophilic polymer and a hydrophobic compound comprising an alkyl group having from about 7 to about 22 carbon atoms, or
   synthesized from a polymerization reaction between a hydrophilic monomer and a hydrophobically modified hydrophilic monomer, the hydrophobically modified hydrophilic monomer comprising an alkyl group having from about 7 to about 22 carbon atoms and the hydrophobically modified hydrophilic monomer being selected from the group consisting of: an alkyl acrylate; an alkyl methacrylate; an alkyl acrylamide; an alkyl methacrylamide; an alkyl dimethylammoniumethyl methacrylate halide; and an alkyl dimethylammoniumpropyl methacrylamide halide;
   introducing a first portion of the treatment fluid into a well bore penetrating a subterranean formation;
   allowing the first portion of the treatment fluid to penetrate into a portion of the subterranean formation in a sufficient amount so as to substantially divert a second portion of the treatment fluid or a different aqueous treatment fluid to another portion of the subterranean formation; and
   introducing the second portion of the treatment fluid or the different aqueous treatment fluid into the subterranean formation.

2. The method of claim 1 wherein the relative permeability modifier is present in the treatment fluid in an amount of from about 0.02% to about 10% by weight of the treatment fluid.

3. The method of claim 1 wherein the hydrophobically modified water-soluble polymer comprises an amino methacrylate/alkyl amino methacrylate copolymer.

4. The method of claim 1 wherein the hydrophobically modified water-soluble polymer comprises at least one polymer selected from the group consisting of: an acrylamide/octadecyldimethylammoniumethyl methacrylate bromide copolymer, a dimethylaminoethyl methacrylate/vinyl pyrrolidone/hexadecyldimethylammoniumethyl methacrylate bromide terpolymer, an acrylamide/2-acrylamido-2-methyl propane sulfonic acid/2-ethylhexyl methacrylate terpolymer, and a dimethylaminoethyl methacrylate/hexadecyldimethylammoniumethyl methacrylate copolymer.

5. The method of claim 1 wherein the hydrophobically modified water-soluble polymer comprises an amino pendant group.

6. The method of claim 1 wherein the hydrophobically modified water-soluble polymer is a reaction product of a hydrophobic compound and a hydrophilic polymer.

7. The method of claim 6 wherein the hydrophilic polymer comprises a polymer backbone and a reactive amino group in the polymer backbone or as a pendant group, the reactive amino group being capable of reacting with the hydrophobic compound.

8. The method of claim 6 wherein the hydrophilic polymer comprises a dialkyl amino pendant group.

9. The method of claim 6 wherein the hydrophilic polymer comprises a dimethyl amino pendant group and at least one monomer comprising dimethylaminoethyl methacrylate or dimethylaminopropyl methacrylamide.

10. The method of claim 6 wherein the hydrophilic polymer comprises at least one polymer selected from the group consisting of: a polyacrylamide; a polyvinylamine; a poly(vinylamine/vinyl alcohol); an alkyl acrylate polymer; a cellulose; a chitosan; a polyamide; a polyetheramine; a polyethyleneimine; a polyhydroxyetheramine; a polylysine; a polysulfone; a gum; a starch; and a derivative thereof.

11. The method of claim 1 wherein the hydrophobic compound comprises at least one compound selected from the group consisting of: an alkyl halide, a sulfonate, a sulfate, an organic acid, and an organic acid derivative.

12. The method of claim 1 wherein the hydrophobically modified water-soluble polymer is synthesized from a polymerization reaction that comprises a hydrophilic monomer and a hydrophobically modified hydrophilic monomer.

13. The method of claim 12 wherein the hydrophilic monomer comprises at least one monomer selected from the group consisting of: acrylamide; 2-acrylamido-2-methyl propane sulfonic acid; N,N-dimethylacrylamide; vinyl pyrrolidone; dimethylaminoethyl methacrylate; acrylic acid; dimethylaminopropylmethacrylamide; vinyl amine; vinyl acetate; trimethylammoniumethyl methacrylate chloride; methacrylamide; hydroxyethyl acrylate; vinyl sulfonic acid; vinyl phosphonic acid; methacrylic acid; vinyl caprolactam; N-vinylformamide; N,N-diallylacetamide; dimethyldiallyl ammonium halide; itaconic acid; styrene sulfonic acid; methacrylamidoethyltrimethyl ammonium halide; a quaternary salt derivative of acrylamide; and a quaternary salt derivative of acrylic acid.

14. The method of claim 12 wherein the hydrophobically modified hydrophilic monomer comprises at least one monomer selected from the group consisting of: an alkyl acrylate; an alkyl methacrylate; an alkyl acrylamide; an alkyl methacrylamide; an alkyl dimethylammoniumethyl methacrylate halide; and an alkyl dimethylammoniumpropyl methacrylamide halide.

15. The method of claim 1 wherein the treatment fluid further comprises at least one additive selected from the group consisting of: a weighting agent; a surfactant; an antifoaming agent; a bactericide; a salt; a foaming agent; a fluid loss control additive; a viscosifying agent; and a gel breaker.

* * * * *